United States Patent Office 2,884,410
Patented Apr. 28, 1959

2,884,410

PROCESS OF PREPARING AN AZO DYE

David I. Randall, Easton, Pa., assignor to General Aniline & Film Corporation, New York, N.Y., a corporation of Delaware No Drawing. Application September 16, 1954
Serial No. 456,636

2 Claims. (Cl. 260—192)

This invention relates to the coloration of synthetic polymeric material and more particularly to the use therefor of dyestuffs of the formula

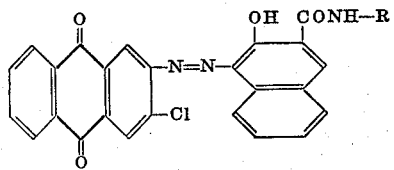

wherein R is an aromatic radical.

It is an object of this invention to provide pigments yielding brown to orange to red shades of superior brightness and light-fastness, the color being dependent on the identity of R. Other objects and advantages will appear as the description proceeds.

The attainment of the above objects is made possible by the use of dyestuffs of the above formula for the coloration of synthetic polymeric material. The excellent light-fastness, brightness and remarkable clarity of shade of the pigments employed in this invention are particularly surprising since literature, particularly the B.I.O.S. reports, has indicated that only α-aminoanthraquinone derivatives give light-fast products.

In the formula given above, R may represent an aromatic radical of the phenyl, diphenyl or naphthyl series, which radicals may be substituted with other groups such as methyl, ethyl, methoxy, ethoxy, nitro, chloro, and the like.

The dyestuffs of the above formula may be produced in well known manner by diazotizing a 2-amino-3-chloroanthraquinone and coupling the diazotized compound with a coupling component of the formula

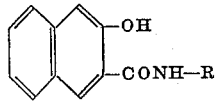

wherein R has the values given above. These coupling components are well known in the art as Naphthol AS type compounds, specific examples of which are disclosed in "Chemical Technology of Dyeing and Printing," volume I, pp. 218 and 219 (1948), by Diserens (Reinhold Publishing Corporation, New York). Among these coupling components, the compound wherein R is o-anisidide (Naphthol ASOL) has been found to yield exceptional results in brightness, light-fastness, and tinctorial strength.

As a further feature of this invention, it has been found that pigments having even greater brightness, tinctorial strength and the like, and an average particle size, particle size distribution and particle surface characteristics specially adapted for coloring synthetic polymer material, are obtained by diazotizing a compound of the formula

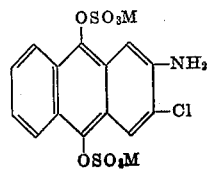

wherein M is selected from the group consisting of H, alkali metals, $NH_4$ and amines, coupling the diazotized compound with a coupling component of the type above described, and then hydrolyzing and oxidizing the resulting azo compound in substance with an oxidizing agent in an acidic medium. In addition, this preferred process employing the disulfuric acid ester of the leuco anthraquinone compound has been found to enable the production of higher yields of the desired dyestuff. The exact reason for the improved properties of the dyestuffs produced by the latter process as compared with products produced by direct diazotization of the unesterified anthraquinone compound followed by coupling and oxidizing, is not definitely understood, and is in fact surprising in view of the additional steps entailed thereby and the well known fact that such process is generally ineffective and impractical for producing an acceptable pigment in good yields. The production of disulfuric acid esters of the leuco compounds of the dyestuffs employed in this invention is disclosed in U.S. Patent No. 1,924,774. However, this patent only discloses the use of such dyestuffs for dyeing vegetable or animal fibers by hydrolysis and oxidation in situ on the fiber. It was indeed surprising to find that when the said disulfuric acid ester compound is hydrolyzed and oxidized in substance, apart from the fiber, pigments of superior properties are obtained especially adapted for the coloration of synthetic polymeric material.

In the above formula for the disulfuric acid ester of the leuco anthraquinone compound, M is preferably sodium, but may if desired be H, potassium, $NH_4$, methylamine, ethylamine, ethanolamine, dimethylamine, diethylamine, diethanolamine, pyridine, morpholine or the like.

Sodium nitrite in the presence of an acidic medium is preferred as the oxidizing agent for producing the pigment in substance from the leuco disulfuric acid ester, brighter products being thereby obtained. However, other oxidizing agents may be employed, as for example ferric chloride, sodium dichromate ammonium persulfate, hydrogen peroxide and the like.

The synthetic polymeric material which may be colored in accordance with this invention may have a basis of regenerated cellulose which may be made by the viscose or cuprammonium process, nitrocellulose, polyacrylonitrile, polyvinylchloride, polyvinyl acetate, polyvinylidene chloride, polyethylene, poly(ethyleneterephthalate), nylon or mixtures and copolymers thereof. Most advantageously, however, the synthetic polymeric material may have a basis of an organic derivative of cellulose such as an organic acid ester of cellulose or a cellulose ether such as cellulose acetate, cellulose propionate, cellulose butyrate, or mixed esters thereof, ethyl cellulose, benzyl cellulose and the like.

The preferred mode of operation in accordance with this invention involves incorporation of the pigment into a solution of the synthetic polymeric material or into a hot melt thereof, in proportions dependent upon the particular polymeric material and dyestuff employed, the depth of shade desired, and the like. Films, filaments and other shaped objects colored in improved bright and light-fast shades may be obtained by extrusion, casting, molding, or otherwise shaping the synthetic polymeric material containing the herein described dyestuffs dispersed therein.

Alternatively, the instant dyestuffs may be mixed with a suitable organic liquid dispersant (e.g. xylenes, banana oil, ethyl acetate, butyl acetate and the like, and mixtures thereof) and the resulting mixture may be employed for coloring shaped products having a basis of synthetic polymeric material by contact therewith as by immersion, padding, spraying, spreading or the like.

When dispersed in organic solvent solutions or hot melts of synthetic polymeric materials preparatory to the formation of shaped colored products therefrom, the dyestuffs of this invention are preferably added in the form of a substantially 100% powder or slurries in an appropriate liquid such as used in acetate extrusion. However, in some instances, particularly when coloring shaped articles having a basis of synthetic polymeric material by treatment with solutions of the instant dyestuff, or when the dyestuff is to be dispersed in an aqueous synthetic polymeric spinning solution such as viscose and the like, admixture with the dyestuff of up to 20% by weight of a finely divided surface active agent is desirable. Such admixture aids in the production of a soft product in addition to assisting in subsequent dispersing and coloring operations. As such surfactants, there may be mentioned polyoxyethylated higher fatty alcohols and acids, and other non-ionic polyoxyethylated surface active agents derived from compounds containing a reactive hydrogen atom.

As stated above, the pigments produced in accordance with this invention by starting with the 2-amino-3-chloroanthraquinone leuco disulfuric acid ester salt have particle characteristics rendering them highly amenable to treatment for inclusion in synthetic polymeric spinning solutions. Such pigments are soft powders which when subjected to suitable grinding operations in a ball mill or the like are readily reduced to a powder wherein the particles preferably have an average diameter of about 0.2 to 2 microns and none are over 5 microns in diameter.

The following examples, in which parts are by weight unless otherwise indicated, are illustrative of the instant invention and are not to be regarded as limitative.

Example 1

*Diazotization.*—In a suitable flask fitted with thermometer and agitator was charged 320 parts 96% sulfuric acid and then 34.6 parts (0.134 mole) sublimed 2-amino-3-chloroanthraquinone. When solution was complete the flask was cooled in an ice bath to a temperature of +5 to +10° C. To the flask there was then charged portionwise 11.2 parts (0.162 mole) sodium nitrite during fifteen minutes at +5 to +10° C. and the solution was stirred for 1 hour at +5 to 10° C. The ice bath was then removed, and the solution was allowed to warm to 25° C. during 1 hour. The reaction mixture was then poured onto 950 parts of ice with agitation. The solid diazonium sulfate was removed by filtration on hardened filter paper, 150 parts ice water being used to rinse the drowning vessel and as a preliminary wash. Then the cake was washed with 285 parts 15% wt./vol. sodium sulfate solution.

*Coupler.*—A solution was prepared from 780 parts distilled water, 22.8 parts sodium hydroxide pellets and 0.63 part polyoxyethylated higher fatty acid emulsifying agent, and to it was added 39.5 (0.135 mole) parts 2-hydroxy-3-naphthoic acid o-anisidide. The mixture was heated to 85° C. to bring the coupler into solution, filtered through cotton to remove the gummy dark colored residue, and the filtrate diluted with 600 parts ice and water slush.

*Coupling.*—The diazo cake was stirred with 5100 parts distilled water at 35° C. for 5 minutes, the slurry filtered and the residue on the filter washed with 360 parts water. The combined filtrate and wash were placed in a receptacle, and cooled to below +4° C. with ice-salt mixture. Into the cooled diazo slurry was dripped with vigorous stirring 1400 parts coupler solution, the temperature of the mixture being kept between 0° and +4° C. When about half of the coupler solution had been added, the diazo mixture became alkaline. At this point a solution of 100 parts of 50% aqueous acetic acid was immediately added. After the mixture had been cooled down below +4° C. again, the addition of remaining coupler slurry was completed. Completion was shown when treatment of a spot of the mixture on paper with coupler solution gave no more pigment. The mixture was stirred at room temperature over-night, filtered, and the cake was then pressed out and washed with 1200 parts methanol, which removed some yellow brown material and possibly excess coupler. This methanol-wet cake was diluted to a thick slurry with water and blended with rapid shear type agitation, the water containing about 0.1% polyoxyethylated higher fatty alcohol dispersing agent to help give a soft product. The resulting foam was pulled down without pressing out, air dried and finally dried in a vacuum desiccator.

Yield = 27.5 parts
= 72.8% of theoretical

The resulting dyestuff was a bright reddish pink powder having excellent light fastness, and could be ball-milled and added to a spinning solution of cellulose acetate in acetone for the production of red-colored filaments, sheets and the like.

Example 2

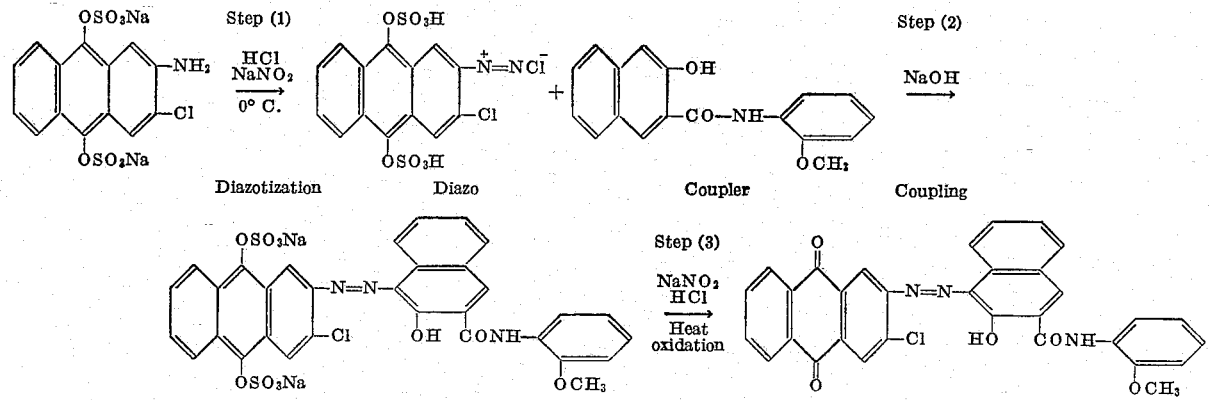

*Diazotization (step 1).*—279 parts of the sodium salt of 2-amino-3-chloroanthraquinone-9,10-disulfuric ester was diluted with distilled water to yield a 5.5% solution and cooled in an ice-salt mixture. Then 1850 parts ice was charged and the mixture was acidified at 0° C. by running in under the surface with good agitation a total of 960 parts of 18% aqueous hydrochloric acid. When about three-fourths of the solution had been added, the color of the mixture changed from deep brown to a pale violet-brown and was acid to Congo red. 275 parts additional 18% aqueous hydrochloric acid were added to provide the required acidity for the diazotization.

The mixture was then diazotized with a solution of 41.6 parts sodium nitrite in 600 parts water at 0° C.

*Coupler and coupling (step 2).*—To a solution of 1370 parts distilled water and 60 parts NaOH pellets was added 174 parts 2-hydroxy-3-naphthoic acid o-anisidide coupler (0.97 mole ratio vs. diester taken) and the mixture was heated to 70° C. with stirring, only long enough to dissolve the coupler. To this solution was then added four times the volume of water and ice slush, the whole cooled in ice to +5° C. The diazo solution (from step 1) at 0° C. was then added slowly to the mixture with good agitation. About 0.002% by weight of Dow-Corning Anti-Foam A (polymethylsiloxane) based on total solution was added when the addition was complete, the final temperature being +5° C. and pH being 9.4. 40% wt./vol. aqueous NaOH solution was immediately added until the pH was 11.5. The mixture was stirred 30 minutes and then allowed to stand overnight, after which 1000 parts NaCl was added and after stirring for several hours, the leuco diester was recovered by filtration. The filter cake was then washed with 1000 parts of 5% aqueous sodium chloride followed by 2000 parts of 3% aqueous sodium chloride.

*Hydrolysis and oxidation (step 3).*—The pressed out cake from step 2 was charged into a suitable container along with 11,000 parts of distilled water. The mixture was heated to 70° C. while stirring. Then 90 parts sodium nitrite and 50 parts 2-ethyl hexanol (anti-foam agent) were charged and with very vigorous agitation, the addition of 730 parts concentrated hydrochloric acid was begun very cautiously. When about 50 parts had been added, foaming of the mixture required the addition of 60 parts additional 2-ethyl hexanol. When the foam had subsided, the rest of the hydrochloric acid was added. The temperature was raised to 80° C. and maintained for ½ hour. On standing, the pigment rose to the surface of the mixture and was recovered by filtration, and washed neutral with about 6000 parts hot distilled water. The presscake was washed with 1200 parts methanol to remove remaining 2-ethyl hexanol, and then dried.

Yield=307 parts
=87% of theoretical

The resulting dyestuff was much higher in tinctorial strength, redder and more lightfast than the dyestuff of Example 1 both in substance and when similarly incorporated into cellulose acetate filaments, sheets, etc.

This invention has been described with respect to certain preferred embodiments and various modifications and variations thereof will become obvious to the person skilled in the art. It is to be understood that such modifications and variations are to be included within the spirit and purview of this application and the scope of the appended claims.

I claim:
1. A process comprising diazotizing a compound of the formula

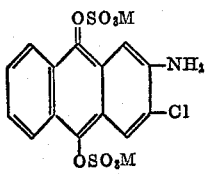

wherein M is selected from the group consisting of H, alkali metals, NH₄ and amines, coupling the diazotized compound with 2-hydroxy-3-naphthoic acid o-anisidide, and then hydrolyzing and oxidizing the resulting azo compound in substance with an oxidizing agent, in an acidic medium to produce a dyestuff of the formula

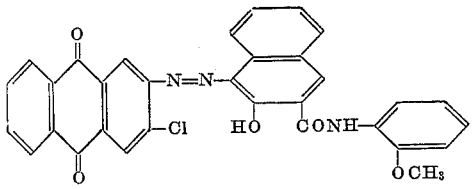

2. A process comprising diazotizing a compound of the formula

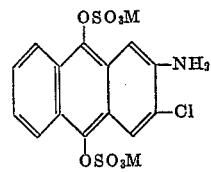

wherein M is selected from the group consisting of H, alkali metals, NH₄ and amines, coupling the diazotized compound with 2-hydroxy-3-naphthoic acid o-anisidide, and then hydrolyzing and oxidizing the resulting azo compound in substance with an oxidizing agent, in an acidic medium to produce a dyestuff of the formula

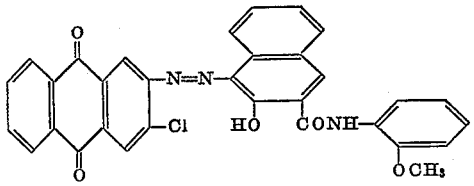

and grinding said dyestuff to a powder wherein the particles have an average diameter of about 0.2 to 2 microns and none are over 5 microns in diameter.

References Cited in the file of this patent
UNITED STATES PATENTS

| | | |
|---|---|---|
| 1,855,289 | Haller et al. | Apr. 26, 1932 |
| 1,924,774 | Fairweather et al. | Aug. 29, 1933 |
| 2,040,927 | Ellis et al. | May 19, 1936 |
| 2,316,758 | Besler | Apr. 20, 1943 |
| 2,347,027 | Besler | Apr. 18, 1944 |

FOREIGN PATENTS

| | | |
|---|---|---|
| 10,085 | Great Britain | of 1914 |